J. F. O'CONNOR.
DRAFT GEAR.
APPLICATION FILED JULY 12, 1915.

1,220,264.

Patented Mar. 27, 1917.

WITNESS
Wm. Geiger

INVENTOR.
John F. O'Connor
BY George D. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

DRAFT-GEAR.

1,220,264.     Specification of Letters Patent.     Patented Mar. 27, 1917.

Application filed July 12, 1915. Serial No. 39,279.

*To all whom it may concern:*

Be it known that I, JOHN F. O'CONNOR, a citizen of the United States, residing at Chicago, in the county of Cook and State of Illinois, have invented a certain new and useful Improvement in Draft-Gears, of which the following is a full, clear, concise, and exact description, reference being had to the accompanying drawings, forming a part of this specification.

This invention relates to improvements in draft gears.

Heretofore in the assembling of certain types of railway draft gears, particularly the friction type wherein springs are located at the rear of the friction mechanism, which springs are inserted through the sides of the spring cage, great difficulty has been experienced in inserting said springs.

As is well known, it is advisable to have the springs under an initial compression when all the parts of the gear are assembled so that this necessitates the spring being inserted laterally through the sides of the spring cage under compression. The springs are made of heavy material and are relatively stiff so that special mechanical means are required to even compress these springs a small fraction of an inch.

The object of my invention is to provide simple means for overcoming the difficulties above indicated.

Figure 1:
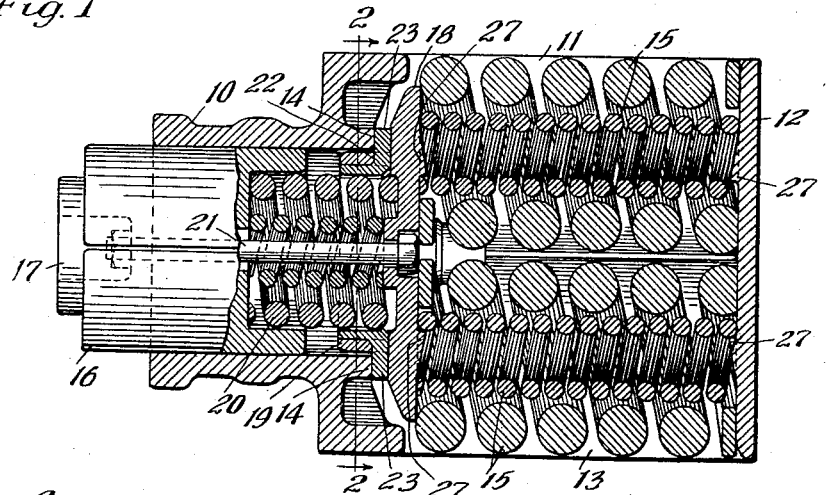
Figure 2:
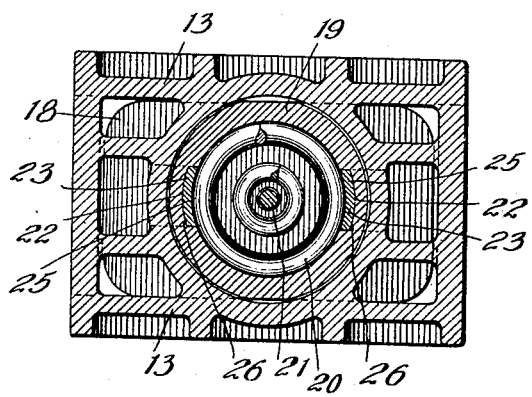
Figure 3:
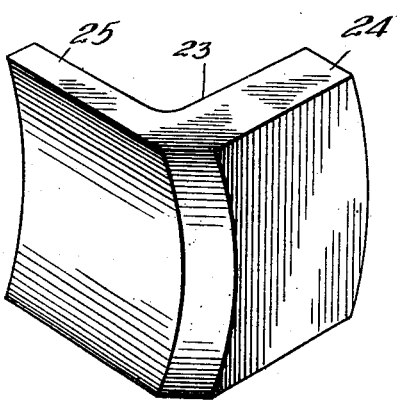

In the drawing forming a part of this specification, Figure 1 is a longitudinal sectional view of a well known type of friction draft gear showing my improvement in connection therewith. Fig. 2 is a transverse sectional view of a structure illustrated in Fig. 1 and taken on the line 2—2 thereof. And Fig. 3 is a detail perspective of the removable key or block employed with my improvements.

In said drawing, 10 denotes a friction shell having a spring cage 11 formed integrally therewith, the cage 11 being of substantially rectangular formation and having an integral rear wall 12, top and bottom walls 13—13 and interior shoulders 14—14 at the front end of the spring cage. The spring cage is open at its sides and through these openings the main springs 15—15 are adapted to be inserted laterally, each of said springs, as shown, comprising nested inner light coils and outer heavy coils. Coöperating with the friction shell 10 are friction shoes 16—16 and wedge 17. At the front end of the twin arranged main springs 15—15 is a spring follower 18 having an annular shoulder 19 on its front face which shoulder 19 fits within the rear portion of the cylinder 10. Interposed between the friction shoes 16 and follower 18 is a preliminary compression spring 20 which, as shown, consists of two nested coils. A bolt 21 which extends from the wedge 17 to the follower 18 is employed to hold the parts in assembled position and the preliminary spring 20 under a slight initial compression. The annular flange 19 of the follower 18, as shown, is provided with a pair of diametrically disposed openings or recesses 22—22 through which are adapted to be inserted keys 23—23, each of the latter being substantially right angular in form and having a relatively thick flange 24 which passes through one of said slots and a thinner curved flange 25 fitting within a correspondingly curved recess 26 on the inner face of the annular flange 19. (See Fig. 2.)

The parts are assembled in the following manner:

The follower 18 is first introduced into the spring cage without the keys 23—23. This permits the follower 18 to move up against the shoulders 14—14. The main springs 15—15 are then introduced laterally through the side openings of the spring cage, the springs not being under compression while inserted. In this connection, it may be observed that this result can be accomplished either by slightly elongating the interior dimension of the spring cage as compared with the present construction or, by using slightly shorter springs or by decreasing the height of the shoulders 14—14. The follower 18 and the springs 15 now being within the spring cage it is comparatively easy to apply pressure to the follower 18 by means of a plunger or other suitable device extending through the cylinder 10. Pressure is thus applied to the follower 18 until the springs 15 are compressed and sufficient clearance is provided between the front face of the follower 18 and the shoulders 14—14 to introduce the keys 23 through the slots 22. After the latter have been inserted and the pressure released, the springs 15 will be under an initial compression approximating the thickness of the flanges 24—24 of the keys 23. Next, the spring 20 is inserted and finally the friction shoes, anti-friction rollers, (not shown) and the wedge. The nut on the end of the bolt 21 is finally applied to hold the friction elements in assembled position.

The main springs 15 are prevented from accidental displacement by means of inclined bosses 27—27 formed on the inner face of the rear wall 12 and the rear face of the follower 18, the inner coils of the nested springs seating upon said bosses, and thus retaining themselves and the outer heavier coils.

Although I have herein shown and described what I now consider the preferred embodiment of my invention as applied to a specific type of draft gear, yet I am aware that modifications and variations may be made in the details of construction and arrangement of parts without departing from the spirit of the invention, and I contemplate all such modifications and variations as come within the scope of the claims appended hereto.

I claim:

1. In a device of the character described, the combination with a spring container, a follower, a spring within said container, of means facilitating the assembling of the spring and follower, said means including a removable member adapted to be inserted between said follower and a portion of said container after the spring and follower have been inserted, said member being movable in unison with the follower.

2. In a device of the character described, the combination with a spring cage open at its sides and through which a spring is adapted to be inserted, a spring, and a follower, said cage having follower shoulders, of a removable key adapted to be attached to said follower to move in unison therewith and inserted therebetween and said shoulder after the follower and spring have been placed within the cage.

3. A friction draft gear for railway cars comprising, a friction shell having an integral spring cage, friction members coöperating with said shell, twin arranged springs within said cage, a follower at the forward ends of said springs, said follower having an annular forwardly extended shoulder provided with perforations therethrough, and angular shaped keys adapted to have portions thereof inserted through said perforations and to thereby space the follower from the adjacent portion of the spring cage.

4. A friction draft gear for railway cars comprising, a friction shell having an integral spring cage, friction elements coöperating with said shell, springs within said cage, a follower at the forward ends of said springs, said follower having a forwardly extended shoulder adapted to slide within said shell, and detachable keys attached to said follower and having portions thereof located between said follower and adjacent portions of the spring cage when the parts are in normal position, to thereby provide an initial compression on the springs, said keys being movable in unison with the follower.

5. A friction gear for railway cars, comprising, a friction shell, a spring cage rigid with respect to said shell, friction elements coöperable with the shell, a spring within the cage, a follower at the forward end of said spring, means for normally spacing said follower from the adjacent portions of the shell and cage, said means including members having a flat flange interposed between said follower and said portions, said flat flanges providing wide bearings.

In witness that I claim the foregoing I have hereunto subscribed my name this 8th day of July, 1915.

JOHN F. O'CONNOR.

Copies of this patent may be obtained for five cents each, by addressing the "Commissioner of Patents, Washington, D. C."